United States Patent [19]

Goodnight, Jr. et al.

[11] 4,091,120
[45] May 23, 1978

[54] LIQUID DIETARY PRODUCT CONTAINING SOY PROTEIN MEMBRANE ISOLATE

[75] Inventors: Kenneth C. Goodnight, Jr.; Grant H. Hartman, Jr., both of Evansville, Ind.; Robert F. Marquardt, Dublin, Calif.

[73] Assignee: Mead Johnson & Company, Evansville, Ind.

[21] Appl. No.: 741,811

[22] Filed: Nov. 15, 1976

[51] Int. Cl.$^2$ ............................ A23L 1/20; A23L 2/00
[52] U.S. Cl. ..................................... 426/598; 426/656; 260/123.5
[58] Field of Search ..................... 426/598, 655, 656; 260/123.5

[56] References Cited

U.S. PATENT DOCUMENTS

| | | | |
|---|---|---|---|
| 3,622,556 | 11/1971 | O'Connor | 426/655 X |
| 3,653,912 | 4/1972 | Koski et al. | 426/656 X |
| 3,736,147 | 5/1973 | Iacobucci et al. | 260/123.5 |
| 3,995,071 | 11/1976 | Goodnight et al. | 426/598 |

Primary Examiner—Raymond N. Jones
Assistant Examiner—R. A. Yoncoskie
Attorney, Agent, or Firm—R. E. Carnahan; R. H. Uloth

[57] ABSTRACT

Superior soy protein beverages are prepared by formulation of carbohydrate, fat, or other nutritional ingredients with the liquid retentate of a soy protein ultrafiltration purification process without first recovering the soy protein by precipitation or drying of the retentate. Short-time high-temperature heat treatment of soy protein solution purified by ultrafiltration improves functional and nutritional qualities thereof.

32 Claims, No Drawings

LIQUID DIETARY PRODUCT CONTAINING SOY PROTEIN MEMBRANE ISOLATE

FIELD OF THE INVENTION

This invention involves a food prepared by combining diverse food materials with a soybean protein extract which has been purified by membrane filtration.

DESCRIPTION OF THE PRIOR ART

The prior art has dealt extensively with the subject of isolation, purification and improvement of the nutritional quality and flavor of soybean protein. Soybean protein in its native state is unpalatable and has impaired nutritional quality due to the presence of phytic acid complexes which interfere with mammalian mineral absorption, and the presence of antinutritional factors which interfere with protein digestion in mammals. The prior art has dealt with the destruction of the trypsin inhibitors by heat treatment and with the removal of phytic acid. It has also dealt with improving the yields of protein secured as purified isolate relative to that contained in the soybean raw material.

Iacobucci, et al., U.S. Pat. No. 3,736,147 patented May 29, 1973 disclose an ultrafiltration process for the preparation of soy protein isolate having a reduced phytic acid content which involves various chemical treatments in combination with extensive ultrafiltration. Chemical treatment involves either enzymatic hydrolysis of the phytic acid by the enzyme phytase at neutral pH prior to ultrafiltration, ultrafiltration in the presence of calcium ion at low pH, or the use of ethylenediamine tetraacetic acid at a high pH.

Frazeur, et al., U.S. Pat. No. 3,728,327 patented Apr. 17, 1973 disclose a membrane separation process for preparation of a soy protein isolate which requires homogenization of a soybean slurry followed by centrifugation and extensive reverse osmosis or ultrafiltration of a highly dilute solution followed by spray drying of the retentate.

O'Connor, U.S. Pat. No. 3,622,556 patented Nov. 23, 1971 is concerned with the preparation of a sunflower meal protein isolate which involves removing green color forming precursors from the protein by ultrafiltration.

SUMMARY OF THE INVENTION

This invention is concerned with liquid dietary products containing soy protein as principle protein ingredient which have improved nutritional value, physical stability, and organoleptic qualities and with a process for their preparation. When soy protein is referred to herein as a "principle protein ingredient" of a liquid dietary product, what is meant is that the soy protein constitutes about 50% by weight or more of the protein contained in the product. More specifically, the invention involves a process for preparing a liquid dietary product which involves forming an aqueous solution of soy protein by extraction of defatted particulate soybean material such as defatted soy flakes or defatted soy meal, at a pH in excess of the isoelectric value of the soyprotein but less than pH 10, separating insoluble material, for instance, by centrifugation, separating at least a portion of soybean carbohydrate and mineral constituents from the clarified extract by filtration employing a semi-permeable membrane that will retain dissolved soy protein and pass dissolved carbohydrate, and formulating the resulting soy protein solution with additional nutritional ingredients to form a liquid dietary product.

Prior processes for the preparation of purified soy protein ingredients for use in food products by ultrafiltration have invariably applied conventional recovery techniques such as freeze drying, spray drying, or isoelectric precipitation to separate the soy protein from the purified retentate resulting from the ultrafiltration process. While high quality protein has been produced, the full functional and nutritional value of the soy protein purified by ultrafiltration has not been realized, because the final isolation steps to secure the protein as a dry ingredient have resulted in partial loss of the advantageous qualities possessed by the native dissolved protein. It has been found that if the retentate from the ultrafiltration isolation process containing dissolved protein is formulated into a liquid dietary product without prior drying or precipitation of the protein, that substantially improved nutritional and organoleptic quality is achieved.

Short-time high-temperature heat treatment of the soy protein isolate solution has been found to further improve the functional properties and nutritional quality thereof. Heat treatment may be applied to the clarified extract prior to ultrafiltration, to the retentate following ultrafiltration, or to the latter after formulation with additional nutritional ingredients, or multiple heat treatment steps may be used in combination.

DETAILED DESCRIPTION OF THE INVENTION

The preferred raw material for the process is particulate defatted soybeans preferably defatted soy flour, defatted soy meal, or defatted soy flakes. Step (a) of the process involves forming an aqueous solution of soy protein at a pH in excess of the isoelectric value of the soy protein but less than pH 10. Water or an aqueous alkaline solution may be used for extraction within the specified pH range. It is not intended to limit the invention to any specified manner of preparing this initial soy extract since many modifications may be made depending upon the various objectives of the process. If the objective is to secure maximum recovery of protein in the extract, large amounts of extract water or alkaline solution are employed and the solids may be removed by centrifugation and re-extracted. Where residual solids are to be used for animal feed, it may be desirable to conduct a less thorough extraction or to omit washing of the solids after removal of the supernatant liquid. Times and temperatures may be varied to suit the particular operating purposes and equipment.

It is preferred not to exceed pH 10.0 or temperatures in excess of about 60° C. for periods of longer than about 30 min. during extraction in the interest of preserving the nutritional quality of the soy protein. It is known that losses of sulphur containing amino acids such as cysteine from soy protein occur under excessive conditions of temperature and alkaline pH. At temperatures of the order of 20°–30° C. no loss of cysteine from dissolved soy protein occurs during periods of 6 hrs. and longer within the specified pH range. It is preferred to operate in the range of about 20°–30° C. for extraction of the soybean raw material. The preferred pH for extraction is within the range of pH 7 to pH 9. Mechanical homogenization is not necessary to effect efficient extraction of the protein and is, in fact, undesirable in that reduction of the flux rate in the subsequent filtration step employing a semi-permeable membrane may occur. Sodium hydroxide, potassium hydroxide or other nontoxic water soluble bases which are suitable for food use but compatible with the soy protein may be used for basification. Alkaline earth metal hydroxides such as barium hydroxide or calcium hydroxide under some conditions of use cause precipitation of the soy protein and are not preferred.

Step (b) involves separation of the spent flakes or meal from the extract. Conventional solid separation unit processes may be employed such as centrifugation or filtration. The desludging centrifuge in which the light liquid stream comprises the soy protein extract has been found to be convenient. The extract may be further clarified by centrifugation in a clarifying centrifuge. This is a preferred mode of operation according to the present invention and a clarified extract comparable in clarity to beer is highly desirable. The clarified extract produced in step (b) is most convenient for further processing if it contains from 1–12% by weight of protein and up to about 10% by weight of carbohydrate, a maximum of about 3% by weight of mineral constituents reported as ash on combustion of the specimen, and no more than about 1% by weight of fat. If extracts are prepared containing more than about 12% by weight of protein, they are generally found to be viscous and inconvenient to handle efficiently during the clarification process. Ordinarily, the initial extract is prepared by employing from about 4 to 40 parts by weight of water or aqueous alkaline solution per part by weight defatted particulate soybean material and preferably from about 8 to 16 parts by weight of water or aqueous solution per part by weight of defatted particulate soybean material.

The clarified extract produced in step (b) containing dissolved soy protein and dissolved soy carbohydrates is then subjected in step (c) to filtration employing a semi-permeable membrane which has the capability to retain dissolved protein as retentate and to pass dissolved carbohydrate as permeate. Preferably, the clarified extract is adjusted to a pH in the range of pH 6.5 to pH 7.5 prior to membrane filtration but this is not essential. Membrane filtration in the range of about pH 6.5 to pH 7.5 has the benefit of minimizing decomposition or interaction of the protein constituents of the extract during the period of membrane filtration which may require several hours.

Filtration in step (c) is preferably carried out using a so-called ultrafiltration apparatus containing a semi-permeable membrane which will retain protein constituents, and allow lower molecular weight materials to pass. Semi-permeable membranes having the capability of retaining proteins having a minimum molecular weight in the range of about 10,000–50,000 daltons are useful. The apparatus is operated at a gauge pressure of about 25 psig but pressures in the range of about 15 to 100 or more psig are useful. Ultrafiltration according to the present invention is to be distinguished from other membrane filtration processes in respect of the porosity of the membrane employed and the pressure maintained on the retentate to force passage of excess water and low molecular weight ingredients. Reverse osmosis processes, for example, use membranes having much lower porosity and retain much lower molecular weight materials such as the carbohydrate constituents of the soybean which it is desired to eliminate by the present process. Reverse osmosis processes are also considerably more expensive to operate in that higher operating pressures and generally lower flux rates are involved.

The clarified extract and retentate during ultrafiltration are preferably maintained at a temperature in the range of about 45° C. to 75° C. for pasteurization, and to improve flux rate through the filter. For the former purpose, a temperature of about 60°–65° C. is preferred. Temperatures in excess of 75° C. are undesirable since chemical decomposition and condensation reactions of the protein occur with the formation, for instance, of lysinoalanine and other undesirable by-products. Below about 60° C. pasteurization is less effective and spoilage may occur. Below about 45° C. the benefit to flux rate improvement diminishes.

It is preferred to produce a final soy protein isolate solution having a protein concentration of about 3% to 7% by weight, but for some purposes lower or higher concentrations may be desirable. The protein concentration of the soy protein isolate solution can be readily adjusted to any value in the range of 1% to 12% by weight by appropriate manipulation of volumes of extraction water, permeate collected, or evaporative concentration or dilution may be employed as long as the protein remains in solution. Protein solutions having concentrations of less than 1% by weight are uneconomical and of little practical interest. For instance, when commencing with a clarified extract having a protein concentration of 3.5%, removal of half of the volume as permeate results in a retentate having a protein concentration of 7%. A substantial reduction in carbohydrate and mineral content occurs through elimination of these ingredients with the permeate water. Since the soybean carbohydrate substituents are generally undesirable nutritional ingredients due to their difficulty of digestion by man, it is desirable to eliminate a major proportion thereof.

We have expressed the carbohydrate content of the purified aqueous soybean protein prepared in our present studies as protein coefficient which is the ratio of the protein content thereof to the total of the protein and carbohydrate content. For infant formula use we prefer a soy protein isolate solution having a protein coefficient of about 0.90 since the soybean carbohydrates cause flatulence and undesirable stools in infants subsisting on the soy protein based formula. Purified soy protein solutions of the present invention having protein coefficients of about 0.8 are suitable for the fortification of conventional foods such as meat and bread for the preparation of liquid dietary products for more mature subjects.

It has been found that by concentration of a 3.5% by weight protein containing extract by ultrafiltration to one-half of its original volume that the retentate still contains an undesirably high proportion of carbohydrate for infant formula use. Such product is suitable for certain other food uses, however. We have found that diafiltration (a form of ultrafiltration in which the retentate is continuously diluted with water or a wash solution) is an appropriate way of eliminating additional undesired carbohydrate and mineral constituents. This amounts simply to continuously adding a diafiltration solution, preferably water, to the retentate as it is circulated through the filtration apparatus and permeate is removed. Diafiltration thus constitutes a washing operation in which the undesired low molecular weight constituents are washed from the retentate.

Referring to the original volume of clarified extract as 1 in a preferred form of the process, ½ volume of permeate is removed by ultrafiltration and then from ½ to 2½ volumes of water are used for dilution of the retentate during diafiltration until the total permeate collected is up to 3 volumes. Diafiltration to provide a larger permeate volume affords little additional purification. Diafiltration may be commenced at a gradual rate near the beginning of the ultrafiltration, and the rate increased as the desired protein concentration is approached, or alternatively, concentration to the desired protein content may precede diafiltration.

Instead of water, diafiltration solutions containing desired ingredients for the final product, or which improve protein retention or flux rate may be employed. In the case of infant formula products, additional ingredients of the final formulated product which contain the present soy protein solution as a principal protein ingredient which may be combined therewith during the diafiltration stage include carbohydrate, fat, and mineral constituents. While this may offer an advantage in some instances, it is generally not a preferred mode of operation since at least a portion of these additives will be lost to the permeate by passage through the membrane. These losses can in part be offset by recovery of the desired ingredients from the permeate or by recycling the permeate to the diafiltration water.

A desirable adjunct to the process constituting an additional novel feature of the invention involves high-temperature short-time (HTST) heat treatment of the extract, and/or retentate, and/or of a liquid dietary product formed from the latter. This modification, constituting a preferred version of the present invention, has several purposes. When conducted prior to ultrafiltration, heat treatment has the benefit of reducing the bacterial count and minimizing the risk of spoilage of the clarified extract during further processing including ultrafiltration. It has the further benefit of facilitating the ultrafiltration step since it has been found that the flux rate at which permeate is formed during ultrafiltration is increased when the clarified extract is heated prior to ultrafiltration. High-temperature short-time heat treatment when used in conjunction with ultrafiltration to produce a soy protein isolate is considered part of the present invention as are soy protein isolates produced thereby. The latter may be formulated as is with the protein in the dissolved state, or they may be dried.

From the standpoint of the utility of the aqueous soy protein isolate solution of the present invention in forming liquid dietary products such as infant formulas, milk substitutes, and meal replacements or supplements, heat treatment has the benefit of improving the nutritional quality of the protein, and of improving the functionality of the protein including a reduction of the viscosity of solutions thereof, and improvement in solubility and fat emulsification properties. These benefits are derived whether heat treatment takes place before or after ultrafiltration.

The time and temperature conditions which are operable for the foregoing purposes do not lend themselves to precise definition, but those skilled in the milk treatment and soy protein extraction arts will have no difficulty in selecting optimum conditions for the particular manufacturing facilities which are available. Broadly speaking, the higher the temperature employed, the shorter the time of treatment with the maximum temperature presently considered applicable being about 150° C. for a period of about 1 sec. When lower temperatures are employed, longer time periods of treatment are necessary, for instance 60° C. for about 30 min. has substantially equivalent effect to 150° C. for 1 sec. Other suitable times and temperatures include 130° for 45–60 secs. and 100° C. for 10 min.

In one preferred mode of the short-term high-temperature heat treatment modification of the process, the heat treatment step is divided so that a relatively mild heat treatment is employed prior to ultrafiltration for the purpose of reducing spoilage and improving flux rate, and then a more severe heat treatment is employed on the finished soy protein retentate after removal of the carbohydrate constituents. This has the advantage of minimizing the browning reaction which results from an interaction of the soybean carbohydrate with the soy protein which has a tendency to occur when carbohydrate containing soy protein extracts are heated. For example, the clarified extract just prior to ultrafiltration may be given a mild heat treatment of from about 60° C. for 30 minutes to 130° C. for 1 minute, cooled to a temperature of about 45°–75° C. and then purified by ultrafiltration as is described above. The resulting aqueous purified soy protein solution retentate may be then given a further more severe heat treatment for the purpose of improving the functionality of the protein and destroying anti-nutritional factors. For this second heat treatment, a temperature in the range of about 110° C. for 1 minute up to about 150° C. for 1 second may be employed. The second heat treatment may be incorporated with subsequent process steps whereby a liquid dietary product is produced from the aqueous purified soy protein by combining other ingredients therewith.

The preferred heat treatment conditions for a given application of the process are determined empirically and adapted to the available equipment by evaluating the performance of the heated extract when heating is carried out for different time periods and at different temperatures. For some purposes, one set of heat treatment conditions may be preferred while another set may be preferable when the resulting aqueous purified soy protein solution is to be used for a different purpose. In any event, the conditions are selected to achieve one or more of the following results:

(i) improving the protein efficiency ratio of said protein solution produced in step (c) or of the liquid dietary product of step (d), (ii) improving the functionality of said protein solution produced in step (c) or of the liquid dietary product of step (d) as measured by sedimentation index, nitrogen solubility index, or emulsion stability index, (iii) increasing the ultrafiltration flux rate in step (c), and (iv) reducing the microbial population of said extract and said retentate sufficiently to substantially eliminate spoilage thereof during ultrafiltration in step (c).

The final step of one embodiment of the present invention involves formulation of the aqueous soy protein which constitutes the retentate on completion of the ultrafiltration or diafiltration into a liquid dietary product by combination with desired carbohydrate and fat ingredients and, if desired, vitamins and minerals, without drying. The resulting products have improved nutritional value and improved functional characteristics such as protein solubility, protein suspendability, viscosity, mouth feel, and emulsion stability.

EXAMPLE 1. LIQUID SOY PROTEIN ISOLATE BY ULTRAFILTRATION

Defatted soy flakes, 50 lbs., and 800 lbs. of tap water at about 21° C. were mixed with thorough agitation and sufficient 50% aqueous sodium hydroxide was added to the mixture to adjust to pH to pH 7.2. A 30-min. period for extraction at pH 7.2 was allowed. The spent flakes were then removed by means of a desludging centrifuge and the light liquid stream comprising the aqueous solution of soy protein was clarified by further centrifugation in a clarifying centrifuge. The extract was then heated by direct steam injection at 105° C. for 1 min. The solution was then cooled at 45° C. and purified by ultrafiltration employing a hollow fiber membrane apparatus (Romicon Hollow Fiber XM50 cartridge) having the capability of retaining protein constituents having a molecular weight of 5,000 daltons or higher and passing lower molecular weight materials including inorganic and carbohydrate constituents. The extract charged to the ultrafiltration process weighed 666 lbs. and had pH 7.36. The soy protein extract constituting the retentate in the ultrafiltration apparatus was concentrated to 333 lbs. during 23 min. of circulation through the hollow fiber apparatus. It exhibited pH 7.22. At this stage, dilution of the retentate with water at the same rate as permeate was collected was commenced until a total of 1,000 lbs. of permeate had been formed. Diafiltration in this manner required 93 min. and the resulting retentate exhibited pH 7.07. The retentate was then heated by direct steam injection at 138° C. for 1 min. and cooled to yield approximately 40 gal. of the liquid soy protein isolate of the present invention. The liquid isolate contained 3.26% by weight of solids, 95% of which was protein (3.10 g. protein per 100 g. of solution).

EXAMPLE 2. FORMULATION OF SOY MILK

A portion of the liquid soy protein isolate produced by the method of Example 1, equivalent to 50 g. of protein is concentrated by vacuum evaporation to a volume of about 1.3 liters. It is then formulated with the following ingredients and homogenized to provide a stable homogeneous suspension constituting a soy milk product representative of the liquid dietary products of the present invention.

| Ingredient | Amount | |
|---|---|---|
| Corn oil | 52.5 | g. |
| Corn syrup solids | 15.6 | g. |
| Sucrose | 60.0 | g. |
| Milk salts | 13.0 | g. |
| Magnesium chloride | 1.3 | g. |
| Carrageenan | 0.75 | g. |
| Lecithin | 6.0 | g. |
| Water, q.s. | 1500 | g. |

The resulting composition contains 3.5% by weight of fat, 3.3% by weight of protein, and 5% by weight of carbohydrate. It has a bland taste quite devoid of the customary beany flavor associated with soybeans and resembles cow's milk in appearance. It is preferably pasteurized following homogenization and bottled for sale in the refrigerated dairy case or it may be canned and heat sterilized in which event refrigeration of the product is not necessary.

EXAMPLE 3. DRIED ULTRAFILTRATION SOY PROTEIN ISOLATE

The product of Example 1 is concentrated by vacuum evaporation (maximum temperature 49° C.) to approximately 20 gal. (12-15% by weight solids) and the concentrated retentate spray dried at 45° C. employing a dryer inlet temperature of 152° C. and a dryer outlet temperature of 82° C. The resulting dried powder is a satisfactory soy protein ingredient for the preparation of various food products.

The advantage relative to functional qualities of incorporating the product of Example 1 into a liquid dietary product as is illustrated in Example 2 rather than first drying the liquid soy protein isolate as is illustrated in Example 3 and incorporating the latter into a liquid dietary product is illustrated by the following comparison in which the sedimentation index, nitrogen solubility index, and emulsion stability index of the products of Examples 1 and 3 were compared. The same parameters were measured in parallel analyses on a commercial acid precipitated soy isolate. The procedures written below were employed for the measurement of the three parameters, and the results are arranged in the following table.

| | UNCTIONAL PROPERTIES | | |
|---|---|---|---|
| Sample | Sedimentation Index (g.) | Nitrogen Solubility Index | Emulsion Stability Index (28 d.) |
| Example 1 | 0.45 | 97 | 38 |
| Example 3 | 2.25 | 87 | 36 |
| Commercial* | 9.84 | 57 | 30 |

*Edi-Pro A, Ralson Purina Company, St. Louis, Mo. 63188

The sedimentation index in the foregoing comparison was determined as follows.
1. The liquid sample is adjusted to a protein concentration of 5% by weight.
2. A 45 g. aliquot is placed in a tared centrifuge tube.
3. The aliquot is spun at 27,500 × G for 15 min. at 18° C.
4. The supernatant liquid is decanted and the tubes inverted and drained on a towel for 1 min.
5. The tubes are weighed and the weight of sediment is determined.
6. Results are expressed as grams of sediment per 45 g. of 5% protein solution.

The nitrogen solubility index in the foregoing experiment was determined as follows.
1. Dissolve the soy protein isolate in water at 2.5% by weight of solids.
2. Adjust to pH 7 and stir for 25 min.
3. Place 25 ml. in a 50 ml. centrifuge tube and centrifuge 20 min. at 5,200 rpm.
4. Filter the supernatant liquid through Whatman No. 1 filter paper and assay the filtrate for protein using the Lowry procedure, Jour. Biol. Chem., 193, 265 (1951).
5. The nitrogen solubility index is expressed as a NSI = % protein in filtrate divided by % protein in original sample multiplied by 100.

The emulsion stability index was determined as follows.
1. Draw up ca. 20 ml. of product into a syringe and force most of it back out a couple of times to remove the air in the syringe. Fill the syringe to the 2 oz. mark.

2. Place the filled syringe, point down, in a support rack.
3. Several syringes can be filled from the same can but some product must be retained for fat analysis of the product before storage. This "before storage" sample is called the initial sample and reflects the fat concentration of the product with a homogeneous dispersion.
4. At the end of the storage time the syringe is taken out of the 37° C. storage chamber. By holding the syringe upright and at eye level, the product defects can be observed and noted. Serum, for instance, is a zone toward the bottom of the syringe, usually of reduced solids and appears "thinner".
5. Push out all but the top ten ml. of test soy milk sample. This remainder is to be saved for duplicate fat analysis.
6. Calculation of results -

$$ESI_{days\ of\ storage} = \frac{Initial\ fat\ \%}{Time\ period\ fat\ \%} \times 100$$

7. Expression of results - "$ESI^7 = 85$" means: Emulsion Stability Index for product stored at seven days equals 85.
8. Interpretation of results - As the fat accumulates at the top of the syringe, the ESI will drop. Example:
   Initial homogeneous value = 7%
   Value at top after 14 days = 12%

$ESI_{14} = 7/12 \times 100 = 58$

For determination of the sedimentation index and the nitrogen solubility index, the products of Examples 1 and 3 were employed. For determination of the emulsion stability index, a fat containing liquid dietary product is required, and for this purpose the products of Examples 1 and 3 were incorporated into a soy milk as is described in Example 2 except that the carrageenan and lecithin were omitted. For preparation of the soy milk from the product of Example 3, 50 g. was dissolved in 500 ml. of water with pH adjustment to pH 7.0 employing 10% aqueous sodium hydroxide and the resulting solution was then formulated as is described in Example 2 except for the omission noted above.

It is evident that the product of Example 1 exhibits a substantial advantage over that of Example 3 and of the commercial soy isolate relative to sedimentation index and nitrogen solubility index. The values given for sedimentation index and nitrogen solubility index have been submitted to statistical analysis of variance which has shown that the differences represented by the values are actual differences. An insufficient number of replicate samples of the emulsion stability index evaluations were employed to permit statistical analysis.

EXAMPLE 4. LIQUID DIETARY PRODUCT FOR MEAL REPLACEMENT OR SUPPLEMENT

Liquid dietary products according to the following formulas were prepared, canned and sterilized. Each 12 fl. oz. can supplied 382.5 g. of product equivalent to 360 dietary calories and containing 21.69 g. of protein, 8.31 g. of fat, and 49.62 g. of carbohydrate. Vitamins and minerals to supply about ⅓ of the recommended daily allowance per 12 fl. oz. were included.

| Ingredient | LLS 12024-1 | LLS 12024-3 |
|---|---|---|
| Sucrose | 1680.0 | 1260.0 |
| Nonfat milk solids | 508.2 | 381.0 |
| Corn syrup solids | 456.0 | 342.0 |
| Partially hydrogenated soy oil | 392.6 | 294.5 |
| Sodium caseinate | 326.4 | 263.1 |
| Calcium caseinate | 326.4 | — |
| Soy protein isolate | 284.9* | 426.3+ |
| Vitamins and minerals | ** | ** |
| Water, q.s. | 1836.8 | 13,770.6 |

*Commercial neutralized acid precipitated soy protein isolate, Promine F (Central Soya Co., Inc., Fort Wayne, Indiana)
**Adjusted to afford proportional recommended daily allowance as indicated above.
+Provided by liquid soy protein isolate prepared by ultrafiltration according to Example 1 modified to provide a product containing 8.68% by weight of solids.

The protein of product LLS-12024-1 was supplied 75% by milk protein and 25% by soy protein as a commercial acid precipitated and neutralized soy protein isolate. The protein of sample LLS 12024-3 was supplied 50% by milk protein and 50% by a soy protein isolate of the present invention. These samples were then evaluated by a taste panel of 40 observers in red room light so that the appearance of the samples could not be distinguished (LLS 12024-3 was slightly darker in color than LLS 12024-1) for organoleptic quality including taste, texture, and odor as well as preference. Organoleptic quality was rated on a 9-point scale. Sample LLS 12024-3 containing the soy protein isolate of the present invention received a quality rating of 6.3 and 74% of the observers preferred this sample. Sample LLS 12024-1 received a quality rating of 5.5 and 26% of the observers preferred this sample. The differences in these values are statistically significant.

A product produced by a process similar to that described in Example 1 except that the heat treatment prior to ultrafiltration involved heating the clarified extract by direct steam injection at a temperature of 130° C. rather than 105° C. as is stated in Example 1, and the heat treatment of the retentate at the conclusion of the process was omitted, was employed for determination of protein efficiency ratio. The method published in *Official Methods of Analysis of the Association of Official Agricultural Chemists*, 10th Edition, 1965, pages 785–786 was employed. The experimental diet employed contained approximately 9% by weight of protein supplied by this soy protein isolate. The value obtained reflected 87% the weight gain achieved with casein. A soy protein isolate prepared by the same procedure but omitting both heat treatment steps and evaluated for nutritional quality by the same method had a protein efficiency ratio 76% that of casein.

What is claimed is:
1. The process for preparing a liquid dietary product containing soy protein as principle protein ingredient which comprises
   (a) forming an aqueous solution of soy protein at a pH in excess of the isoelectric value of said soy protein but less than pH 10, said soy protein being obtained by aqueous extraction of defatted particulate soybean at a pH in excess of the isoelectric value of the soy protein;
   (b) separating insoluble material from said solution to yield a clarified extract containing dissolved protein and dissolved carbohydrate;
   (c) separating carbohydrate from said clarified extract by filtration employing a semi-permeable membrane which has the capability to retain dis- solved protein as retentate and to pass dissolved carbohydrate as permeate; and (d) combining said retentate containing dissolved protein with additional nutritional ingredients to form a liquid dietary product, said liquid dietary product having improved nutritional value and physical stability relative to a similar product prepared from dried or precipitated soy protein isolate.

2. The process of claim 1 wherein said filtration employing a semi-permeable membrane in step (c) includes diafiltration.

3. The process of claim 2 wherein diafiltration is continued until said retentate has a protein coefficient of at least about 0.8.

4. The process of claim 2 wherein diafiltration is continued until said retentate has a protein coefficient of at least about 0.9.

5. The process of claim 1 wherein said clarified extract and said retentate in step (c) are maintained at a temperature of within the range of about 45° C to 75° C. during membrane filtration.

6. The process of claim 1 wherein forming said solution of soy protein in step (a) comprises aqueous extraction of defatted particulate soybean at pH 7–9.

7. The process of claim 1 wherein said filtration employing a semi-permeable membrane in step (c) is conducted in the range of pH 6.5 to pH 7.5.

8. The process of claim 1 wherein step (b) includes heating said clarified extract at a temperature of from 60° C. to 150° C. for a period sufficient to:
  (i) improve the protein efficiency ratio of said protein solution produced in step (c),
  (ii) improve the functionality of said soy protein solution produced in step (c) as measured by sedimentation index, nitrogen solubility index, or emulsion stability index,
  (iii) increase the ultrafiltration flux rate in step (c), or
  (iv) reduce the microbial population of said extract and said retentate sufficiently to substantially eliminate spoilage thereof during filtration employing a semi-permeable membrane in step (c), said clarified extract having a pH in excess of the isoelectric value of said protein but less than pH 10 during said heating.

9. The process of claim 8 wherein said period is from 1 sec. to 30 min.

10. The process of claim 8 wherein said heating is at a temperature in the range of from 60° C. to 130° C. for a period of from 45 sec. to 30 min.

11. The process of claim 1 wherein said retentate produced in step (c) is heated at a temperature in the range of from 60° C. to 150° C. for a period sufficient to:
  (i) improve the protein efficiency ratio of said retentate, or
  (ii) improve the functionality of said retentate as measured by sedimentation index, nitrogen solubility index, or emulsion stability index.

12. The process of claim 11 wherein said retentate is combined with additional nutritional ingredients before heating.

13. The process of claim 11 wherein said period is from 1 sec. to 30 min.

14. The process of claim 11 wherein said temperature is in the range of from 60° C. to 130° C. and said period is from 45 sec. to 30 min.

15. The product produced by the process of claim 1.
16. The product produced by the process of claim 3.
17. The product produced by the process of claim 4.
18. The product produced by the process of claim 6.
19. The product produced by the process of claim 8.
20. The product produced by the process of claim 11.

21. A process for preparing an aqueous soy protein isolate solution which comprises
  (a) forming an aqueous solution of soy protein at a pH in excess of the isoelectric value of said soy protein but less than pH 10, said soy protein being obtained by aqueous extraction of defatted particulate soybean at a pH in excess of the isoelectric value of of the soy protein;
  (b) separating insoluble material from said solution to yield a clarified extract containing dissolved protein and dissolved carbohydrate;
  (c) heating said clarified extract at a temperature of from 60° C. to 150° C. for a period sufficient to
    (i) improve the protein efficiency ratio of resulting soy protein isolate solution,
    (ii) improve the functionality of resulting soy protein isolate solution as measured by sedimentation index, nitrogen solubility index, or emulsion stability index;
    (iii) increase the flux rate in subsequent filtration of said clarified extract employing a semi-permeable membrane, or
    (iv) reduce the microbial population of said clarified extract sufficiently to substantially eliminate spoilage thereof during subsequent filtration employing a semi-permeable membrane;
  (d) separating carbohydrate from said clarified extract by filtration employing a semi-permeable membrane which has the capability to retain dissolved protein as retentate and to pass dissolved carbohydrate as permeate.

22. The process of claim 21 wherein said heat treatment period is from 1 sec. to 30 min.

23. The process of claim 21 wherein said heat treatment is at a temperature in the range of from 60° C. to 130° C. for a period of from 45 sec. to 30 min.

24. The process of claim 21 wherein said soy protein isolate is dried.

25. The process for preparing an aqueous soy protein isolate solution which comprises
  (a) forming an aqueous solution of soy protein at a pH in excess of the isoelectric value of said soy protein but less than pH 10, said soy protein being obtained by aqueous extraction of defatted particulate soybean at a pH in excess of the isoelectric value of the soy protein;
  (b) separating insoluble material from said solution to yield a clarified extract containing dissolved protein and dissolved carbohydrate;
  (c) separating carbohydrate from said clarified extract by filtration employing a semi-permeable membrane which has the capability to retain dissolved protein as retentate and to pass dissolved carbohydrate as permeate; and
  (d) heating said retentate at a temperature in the range of from 60° C. to 150° C. for a period sufficient to
    (i) improve the protein efficiency ratio of resulting soy protein isolate solution, or
    (ii) improve the functionality of resulting soy protein isolate solution as measured by sedimentation index, nitrogen solubility index, or emulsion stability index.

26. The process of claim 25 wherein said period is from 1 sec. to 30 min.

27. The process of claim 25 wherein said temperature is in the range of from 60° C. to 130° C. and said period is from 45 sec. to 30 min.

28. The process of claim 25 wherein said soy protein isolate solution is dried.

29. The product produced by the process of claim 21.
30. The product produced by the process of claim 24.
31. The product produced by the process of claim 25.
32. The product produced by the process of claim 28.

* * * * *